Patented Aug. 2, 1949

2,477,928

UNITED STATES PATENT OFFICE 2,477,928

CAROTENE COMPOSITION AND PROCESS OF PREPARING SOLUTIONS OF CAROTENE

Miner L. Hartmann, Beverly Hills, and Harold M. Barnett, Long Beach, Calif.; said Hartmann assignor to said Barnett No Drawing. Application November 4, 1947, Serial No. 784,074

15 Claims. (Cl. 99—11)

This invention relates to a carotene composition and to a process for preparing solutions from crystalline carotene.

One object of the invention is to provide a method for making solutions from the crystalline form of carotene in edible solvents and oil containing food products in which the carotene is only slightly soluble. Another object is to provide a method for making a solution from crystalline carotene without loss of vitamin activity of the carotene due to molecular rearrangement caused by heating. Another object is to provide a new composition of easily soluble crystalline carotene which does not oxidize rapidly in storage. Another object is to provide a suspension of crystalline carotene particles in which the crystals do not grow. A further object is to provide a readily soluble form of crystalline carotene of highly concentrated vitamin activity which will dissolve readily without warming.

These and other objects are attained by the invention which will be understood from the following description.

Carotene, particularly beta-carotene, is an industrially important yellow coloring material as well as a pro-vitamin which is converted in the animal metabolic processes to vitamin A. Carotene is extracted and concentrated from vegetable sources such as carrots, in which it occurs in amounts of about two ounces per ton of carrots, and consequently it has a high unit cost of production. The crystalline form of carotene is highly preferred because of its freedom from noxious flavors and odors which are present in the concentrated extracts of carotene with other plant pigments which are sometimes supplied to the food industry. Carotene is only slightly soluble in oils, the solubility amounting to not more than about three-tenths percent at ordinary room temperature. The solubility in oil increases when the oil is heated but upon heating, a part of the carotene is chemically transformed irreversibly to an inactive carotene or to some unidentified inactive decomposition or rearrangement product, the amount of degradation increasing rapidly as the temperature is increased. In one case, the loss of active carotene was 12 percent at 115° C.; 20 percent at 130° C.; 30 percent at 150° C.; and becoming almost completely transformed at the melting point, about 170° C.

The problem of making oil solutions, particularly concentrated solutions, from crystalline carotene has remained unsolved from a practical point of view. The most used present method of preparing marketable oil solutions of carotene consists in warming an oil to about 100° C. and stirring vigorously after the addition of the desired amount of ordinary crystalline carotene until it is all dissolved. This has the disadvantages that usually, unless suitable precautions are taken, air and oxygen are introduced into the solution which destroys part of the carotene by oxidation, and some of the carotene, in amounts as much as ten to fifteen percent, is converted to an inactive form as noted above, which renders this portion of the crystalline carotene useless from the point of view of its vitamin and coloring potency. The preparation of solutions of crystalline carotene under the higher temperatures which cause this rearrangement, also results in an off-flavor which is detectable in the more delicately flavored foods when this carotene is added to such foods. Since crystalline carotene is necessarily a high cost material, this inherent loss of potency in preparing the material in an acceptable form for shipment and distribution adds to its ultimate cost to the consumer, and represents an unreclaimable economic loss. The heavy cost of shipping large volumes of oil containing the maximum amount of carotene which can be dissolved at ordinary temperatures is also overcome by our invention. It is desirable to have the carotene in as concentrated form as possible for shipment to food processing plants and the like where it is normally incorporated with other food materials, usually dissolved in oil-containing foods such as, for example, margarine, butter, salad dressings, milk and the like. A readily soluble concentrated form is desirable in pharmaceutical preparations, vitamin capsules, etc.

It has been found that a paste consisting of very finely divided microscopic particles of carotene suspended in a liquid which is edible, miscible with oil or oily products, and which is also an oxidation protective liquid, may be prepared and used to overcome the above enumerated difficulties. Such a paste product may be made which has as high as 50 percent by weight of carotene in cottonseed oil, equivalent to 376 million vitamin A units per pound. The highest concentration of pure carotene in cottonseed oil or equivalent oils commercially available is about four million units. The new paste composition may be employed to produce the dilute solutions of carotene employed in the food industries. Crystalline carotene is disintegrated to microscopically small particles, for example, by means of a ball mill using a small amount of the selected liquid medium in an amount sufficient to form a relatively thick paste with the disintegrated carotene. This operation requires long grinding in a ball mill and it is essential that it be carried out in such a way that the temperature of the mixture is not deleteriously increased by the grinding action. It is also important to displace the air in the grinding equipment by an inert gas medium such as pure nitrogen or pure carbon dioxide gas. The time of grinding is determined by the size and proportion of the balls and other factors which are common to the operation of comminution by means of ball mills. The material is pulverized until substantially all particles have mean diameters of less than ten microns and many particles are of the order of one or two microns in diameter. The proportion of liquid to carotene is preferably that which at operating temperatures forms a stiff paste but one which flows enough in the ball mill to give effective comminution. It has been found, for example, that 100 grams of carotene may be ground in a ball mill with 300 grams of cottonseed oil until by microscopic test no particles are larger than ten microns measured as mean diameters. The product is a paste which will barely flow and which has a specific gravity of 0.9. Such a product has been found to remain in uniform suspension for an indefinitely long period of time, and microscopic examination over a period of twelve months disclosed no segregation of the larger particles toward the bottom of the container.

The paste composition of crystalline carotene and a liquid may also be prepared by passage of the mixture through a so-called colloid mill, particularly one of the closely spaced plate type, although the ball-mill process has given a more uniform product.

The preferred liquid medium is a vegetable oil such as cottonseed oil. However, other oils including mineral oils, vegetable oils, and animal oils, may be used as well as non-oily liquid media, such as for example, alcohols, glycerine, syrup, lecithin, liquid egg albumin, water, and the like. It is not necessary to use a liquid medium in which the carotene dissolves and it is, in some cases, advantageous to use a liquid media in which carotene is substantially insoluble since, with such media, there is no danger of recrystalization and growth of the finest particles of carotene to form larger and slower dissolving particles in the paste. For use as a concentrated form of carotene in making dilute solutions with a minimum dissolving time, it is desirable to have every particle of carotene as fine as is practicable, and the use of a non-dissolving liquid such as water or lecithin media prevents any growth.

A medium may be selected which at room or refrigerated temperatures is solid, but which becomes liquid at only slightly elevated operating temperatures, such as butter oil, paraffin, or lard. These materials have the advantage of providing a solid concentrated form of carotene which becomes readily dispersible and soluble in liquid oils and food products at slightly elevated temperatures sufficient to melt such media, and also prevent any coalescing of the fine carotene particles.

The process of making a dilute solution of carotene in an edible solvent or to disperse the carotene in an oil-containing food product consists in adding the desired amount of the above highly concentrated form of carotene paste to the edible solvent or food product and then distributing the paste throughout the mixture while maintaining the temperature of the mixture at a sufficient low temperature so that none or only a little the carotene is transformed to the inactive varities noted above. The liquid media of the particular paste product being used may be selected that it is easily miscible with the edible solver (usually oil) or other food product. It has been found that the carotene is quickly dissolved from the distributed paste, since the particles are an ultra fine form in which they existed in the paste and therefore are quickly dissolved.

The advantages of the concentrated paste form of carotene of this invention have been pointed out. The liquid media used in making the paste provides the protective coating for the microscopically fine carotene which prevents oxidation which would otherwise be quite rapid unless completely protected from air. The concentrated form and easy solubility of the paste composition of carotene makes its packaging shipping, and proportioning both convenient and economical, either in liquid paste or as a solidified paste. The invention provides a practical means for distributing crystalline carotene in food materials, thus taking advantage of the outstanding characteristic of pure crystalline carotene which is freedom from undesired odors and flavors.

We claim:

1. A composition of matter containing as essential ingredients finely divided particles of crystalline carotene in a stable suspension in a edible liquid, said particles having mean diameters of less than ten microns.

2. A composition of matter containing as essential ingredients finely divided particles of crystalline carotene in a stable suspension in a edible oil miscible liquid, said particles having mean diameters of less than ten microns.

3. A composition of matter containing as essential ingredients finely divided particles of crystalline carotene in a stable suspension in liquid medium in which said carotene is substantially insoluble, said particles having mean diameters of less than ten microns.

4. A composition of matter containing as essential ingredients finely divided particles of crystalline carotene in a stable suspension in a edible oil, said particles having mean diameters of less than ten microns.

5. A composition of matter containing as essential ingredients finely divided particles of crystalline carotene in a stable suspension in a oily medium which is liquid at the temperature of forming said suspension but becomes solidified by cooling after said suspension is formed, said particles having mean diameters of less than ten microns.

6. A composition of matter containing as essential ingredients finely divided particles of crystalline carotene in a stable suspension in butter oil, said particles having mean diameters of less than ten microns.

7. A composition of matter containing as essential ingredients finely divided particles of crystalline carotene in a stable suspension in paraffin said particles having mean diameters of less than ten microns.

8. A composition of matter containing as essential ingredients finely divided particles of crystalline carotene in a stable suspension in lard said particles having mean diameters of less than ten microns.

9. The method of preparing a solid, oil-soluble carotene composition comprising the steps of forming a paste suspension of comminuted crys talline carotene substantially all of the particles of which have mean diameters of less than ten microns in an oil which is liquid at the temperature of forming said suspension, and then cooling said liquid suspension until said paste is a solid.

10. The method of preparing a solid, oil-soluble carotene composition comprising the steps of forming a paste suspension of comminuted crystalline carotene substantially all of the particles of which have mean diameters of less than ten microns in butter oil, and then cooling said liquid suspension until said paste is a solid.

11. The method of preparing a solid, oil-soluble carotene composition comprising the steps of forming a paste suspension of comminuted crystalline carotene substantially all of the particles of which have mean diameters of less than ten microns in lard, and then cooling said liquid suspension until said paste is a solid.

12. The process of making a solution of crystalline carotene in an edible solvent comprising forming an edible paste of a liquid and fine particles of crystalline carotene substantially all of which have mean diameters of less than ten microns, and then distributing said paste in said edible solvent.

13. The process of making a solution of crystalline carotene in an edible oil comprising forming a paste of an edible oil and fine particles of crystalline carotene substantially all of which have mean diameters of less than ten microns, and then distributing said paste in said edible oil while maintaining the materials at a temperature below about 115° C.

14. The process of making a solution of crystalline carotene in an oil-containing food material comprising forming a paste of an edible liquid and fine particles of crystalline carotene substantially all of which have mean diameters of less than ten microns, and then distributing said paste in said food material while maintaining the materials at a temperature below about 115° centigrade.

15. The process of making a solution of crystalline carotene in an oil-containing food material comprising forming a paste of a liquid edible oil and fine particles of crystalline carotene substantially all of which have mean diameters of less than ten microns, and then distributing said paste in said food material while maintaining the materials at a temperature below the inactivation temperature of the carotene.

MINER L. HARTMANN.
HAROLD M. BARNETT.

REFERENCES CITED

The following references are of record in the file of this patent:

UNITED STATES PATENTS

| Number | Name | Date |
| --- | --- | --- |
| 2,197,095 | Cuenod | Apr. 16, 1940 |
| 2,236,517 | Cahn et al. | Apr. 1, 1941 |
| 2,307,756 | Blaso | Jan. 12, 1943 |
| 2,382,242 | Lindow et al. | Aug. 14, 1945 |